United States Patent
Wu et al.

(10) Patent No.: US 9,235,569 B1
(45) Date of Patent: Jan. 12, 2016

(54) TECHNIQUES FOR ON-THE-SPOT TRANSLATION OF WEB-BASED APPLICATIONS WITHOUT ANNOTATING USER INTERFACE STRINGS

(71) Applicant: Google Inc., Mountain View, CA (US)

(72) Inventors: Chenjun Wu, Mountain View, CA (US); Yongping Luo, San Ramon, CA (US)

(73) Assignee: Google Inc., Mountain View, CA (US)

( * ) Notice: Subject to any disclaimer, the term of this patent is extended or adjusted under 35 U.S.C. 154(b) by 14 days.

(21) Appl. No.: 14/315,409

(22) Filed: Jun. 26, 2014

(51) Int. Cl.
*G06F 17/28* (2006.01)
(52) U.S. Cl.
CPC .................................... *G06F 17/289* (2013.01)
(58) Field of Classification Search
None
See application file for complete search history.

(56) References Cited

U.S. PATENT DOCUMENTS

| | | | |
|---|---|---|---|
| 6,490,547 B1 * | 12/2002 | Atkin | G06F 17/289 704/3 |
| 7,584,216 B2 | 9/2009 | Travieso et al. | |
| 8,433,718 B2 | 4/2013 | Travieso et al. | |
| 8,442,811 B1 | 5/2013 | Broniek et al. | |
| 2007/0244691 A1 * | 10/2007 | Alwan | G06F 17/2276 704/8 |
| 2013/0007588 A1 | 1/2013 | Guo et al. | |
| 2013/0091425 A1 | 4/2013 | Hughes et al. | |
| 2013/0253901 A1 * | 9/2013 | Krack | G06F 17/289 704/2 |
| 2015/0121193 A1 * | 4/2015 | Beveridge | G06F 17/30893 715/234 |

* cited by examiner

*Primary Examiner* — Qian Yang
(74) *Attorney, Agent, or Firm* — Remarck Law Group PLC

(57) ABSTRACT

A computer-implemented technique can include executing a web-based application and receiving a request to translate at least a portion of the web-based application. In response to receiving the request, the technique can include identifying text portions in the web-based application, transmitting the text portions to a server, wherein receipt of the text portions causes the server to match the text portions to entries in a database associated with the server to obtain UI strings, and receiving the UI strings from the server. In in response to receiving the UI strings, the technique can include providing an indicator of a particular UI string when the particular UI string is displayed during execution of the web-based application. The technique can also include receiving a selection of the particular UI string, and outputting metadata associated with the particular UI string, the metadata representing context information for assisting a human translator.

20 Claims, 4 Drawing Sheets

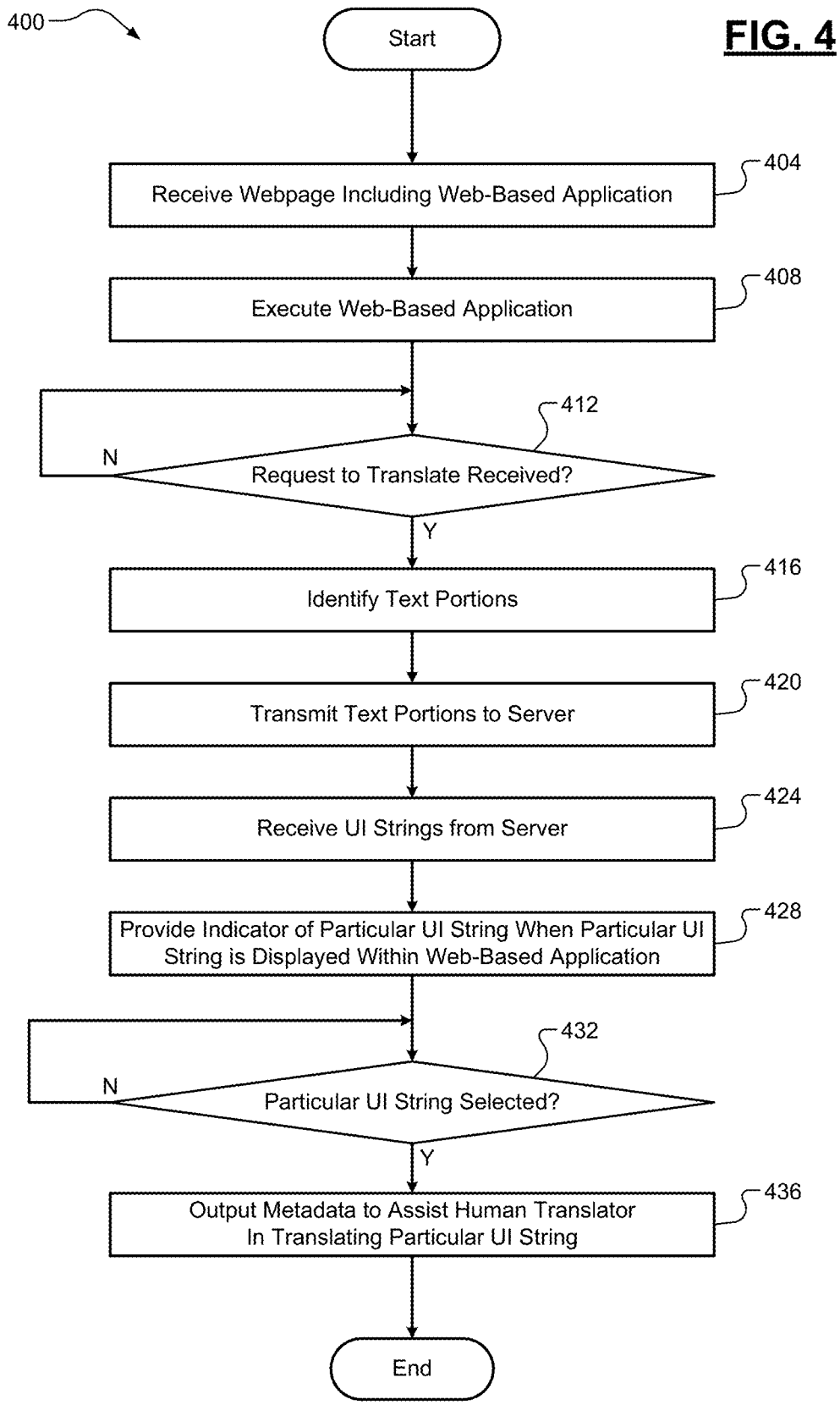

TECHNIQUES FOR ON-THE-SPOT TRANSLATION OF WEB-BASED APPLICATIONS WITHOUT ANNOTATING USER INTERFACE STRINGS

FIELD

The present disclosure relates to language translation and, more particularly, to techniques for on-the-spot language translation of web-based applications without annotating user interface (UI) strings.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Web-based applications can refer to any software application executable within web browser software by a processor of a computing device. Examples of web-based applications include a web-based video streaming/playback application and a web-based email application. Each web-based application is associated with a source code, which may be contained within a source document for an associated webpage. The source code can be written in any suitable computing language (e.g., JavaScript) that can then be interpreted and executed by the processor of the computing device. The source code can be developed by a programmer and then be distributed to the user by the programmer or by a vendor. In the case of web-based applications, the source code can be provided to the user's computing device from a remote server via a network, such as in response to requesting the source document for the webpage.

SUMMARY

A computer-implemented technique is presented. The technique can include receiving, at a computing device having one or more processors, a source document for a webpage requested by web browser software executing at the computing device, the webpage including a web-based application. The technique can include executing, at the computing device, the web-based application within the web browser software. The technique can include receiving, at the computing device, a request to translate at least a portion of the web-based application. The technique can include in response to receiving the request: identifying, at the computing device, text portions in the web-based application, transmitting, from the computing device to a server, the text portions, wherein receipt of the text portions causes the server to match the text portions to entries in a database associated with the server to obtain UI strings, and receiving, at the computing device from the server, the UI strings. The technique can include in response to receiving the UI strings, providing, at the computing device, an indicator of a particular UI string when the particular UI string is displayed during execution of the web-based application. The technique can include receiving, at the computing device, a selection of the particular UI string. The technique can also include outputting, at the computing device, metadata associated with the particular UI string, the metadata representing context information for assisting a human translator in translating the particular UI string.

In some embodiments, the metadata includes context information that is outside of a context of the web-based application.

In other embodiments, the metadata includes at least one of an identifier for the UI string, a language of the UI string, and an identifier for the webpage.

In some embodiments, the technique further includes obtaining, at the computing device, the metadata from the database associated with the server (i) when receiving the UI strings or (ii) in response to the selection of the particular UI string.

In other embodiments, receipt of the text portions causes the server to (i) segment the text portions to obtain segmented text portions and (ii) match segmented text portions to entries in the database to obtain the UI strings In some embodiments, the database is constructed by: scanning a collection of source documents for webpages to identify source text portions, and identifying source text portions that occur more than once in their respective source documents to obtain the entries for the database.

In other embodiments, the database is constructed by normalizing each entry with respect to its specific form based on (i) whether it includes a placeholder and (ii) whether it includes a plural or gender form, wherein a specific placeholder identifies a generic portion of a specific entry.

In some embodiments, providing the indicator for the particular UI string includes highlighting the particular UI string.

In other embodiments, the technique further includes in response to receiving the request, executing, at the computing device, a translation application within the web browser software, wherein the translation application is configured to: (i) identify the text portions, (ii) transmit the text portions to the server, (iii) receive the UI strings from the server, (iv) cause the indicator for the particular UI sting to be provided when the particular UI string is displayed during execution of the web-based application, (v) detect the selection of the particular UI string, and (vi) obtain and output the metadata associated with the particular UI string.

In some embodiments, the translation application is a JavaScript extension or plug-in for the web browser software that is (i) manually installed by the human translator or (ii) automatically called by the webpage using a JavaScript application program interface (API).

A computing device having one or more processors configured to perform operations is also presented. The operations can include receiving a source document for a webpage requested by web browser software executing at the computing device, the webpage including a web-based application. The operations can include executing the web-based application within the web browser software. The operations can include receiving a request to translate at least a portion of the web-based application. The operations can include in response to receiving the request: identifying text portions in the web-based application, transmitting the text portions to a server, wherein receipt of the text portions causes the server to match the text portions to entries in a database associated with the server to obtain UI strings, and receiving the UI strings from the server. The operations can include in response to receiving the UI strings, providing an indicator of a particular UI string when the particular UI string is displayed during execution of the web-based application. The operations can include receiving a selection of the particular UI string. The operations can also include outputting metadata associated with the particular UI string, the metadata representing context information for assisting a human translator in translating the particular UI string.

In some embodiments, the metadata includes context information that is outside of a context of the web-based application.

In other embodiments, the metadata includes at least one of an identifier for the UI string, a language of the UI string, and an identifier for the webpage.

In some embodiments, the operations further include obtaining the metadata from the database associated with the server (i) when receiving the UI strings or (ii) in response to the selection of the particular UI string.

In other embodiments, receipt of the text portions causes the server to (i) segment the text portions to obtain segmented text portions and (ii) match segmented text portions to entries in the database to obtain the UI strings In some embodiments, the database is constructed by: scanning a collection of source documents for webpages to identify source text portions, and identifying source text portions that occur more than once in their respective source documents to obtain the entries for the database.

In other embodiments, the database is constructed by normalizing each entry with respect to its specific form based on (i) whether it includes a placeholder and (ii) whether it includes a plural or gender form, wherein a specific placeholder identifies a generic portion of a specific entry.

In some embodiments, providing the indicator for the particular UI string includes highlighting the particular UI string.

In other embodiments, the operations further include in response to receiving the request, executing a translation application within the web browser software, and wherein the translation application is configured to: (i) identify the text portions, (ii) transmit the text portions to the server, (iii) receive the UI strings from the server, (iv) cause the indicator for the particular UI sting to be provided when the particular UI string is displayed during execution of the web-based application, (v) detect the selection of the particular UI string, and (vi) obtain and output the metadata associated with the particular UI string.

In some embodiments, the translation application is a JavaScript extension or plug-in for the web browser software that is (i) manually installed by the human translator or (ii) automatically called by the webpage using a JavaScript application program interface (API).

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 depicts a flow diagram of an example technique for on-the-spot language translation of web-based applications without annotating UI strings according to some implementations of the present disclosure.

DETAILED DESCRIPTION

Figure 1:
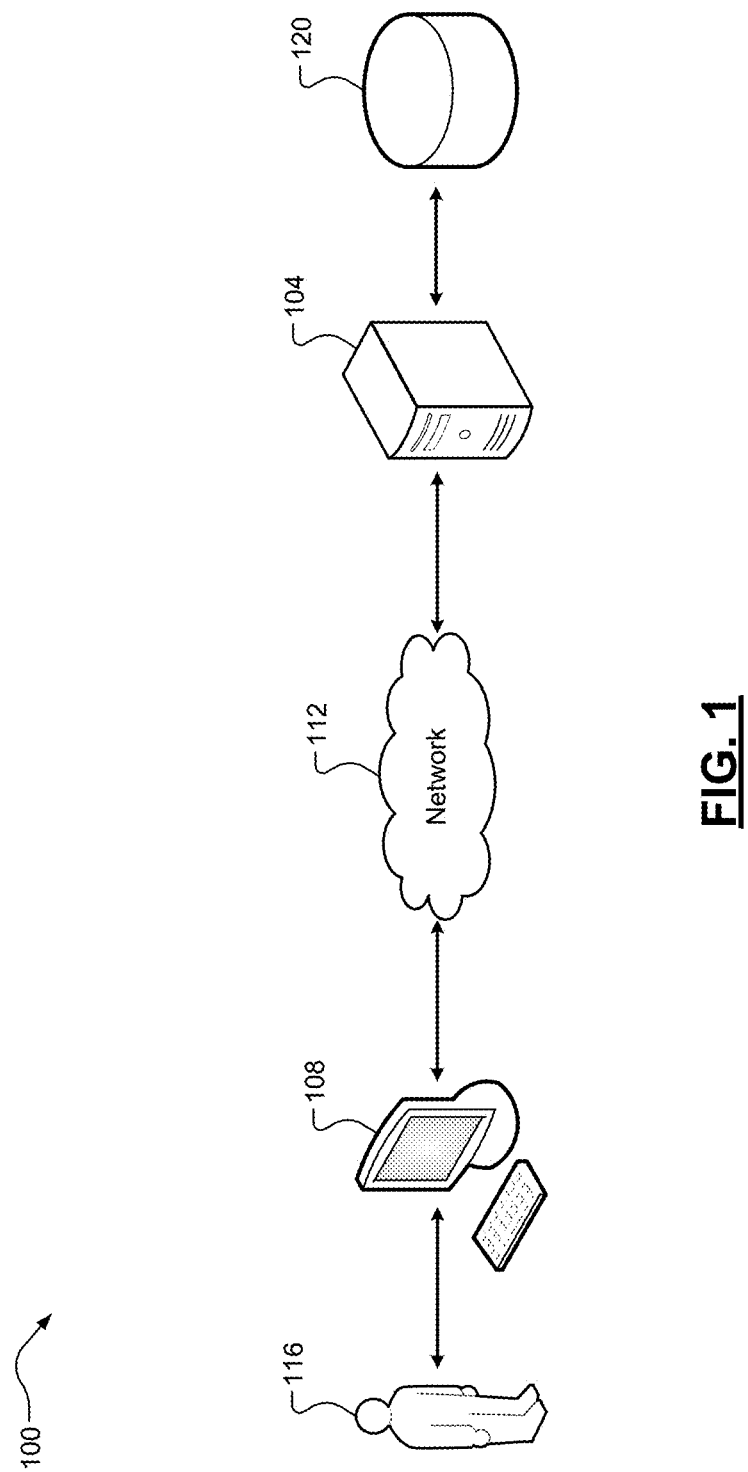
FIG. 1 depicts a computing network including an example server and an example computing device according to some implementations of the present disclosure.

Given the worldwide reach of the Internet, users of web-based applications may speak and/or understand different languages. A programmer that develops a source code for a specific web-based application, however, may only develop the source code with respect to a particular source language, e.g., English. Some users, therefore, may be unable to understand portions of the specific web-based application. In particular, a user interface (UI) generated and output during execution of the specific web-based application may include one or more messages ("UI strings") that are in the source language, which may not be understandable by some users. These users may desire that the UI strings be translated to a target language that is different than the source language. Language translation can be performed either by a computing device (machine translation) or by a human translator (manual translation). Manual translation may be preferred over machine translation because manual translation is typically more accurate.

Human translators, however, may be unable to understand portions of the source code and, more importantly, these human translators may be unable to discern the context of each UI string. Moreover, it can be difficult and/or time consuming for the programmer to add information to the source code to assist the human translators. Additionally, there is not necessarily a direct mapping between the UI strings in the executing web-based application and the UI strings in the source code. Rather, a single UI string in the source code may appear more than once during the execution of the web-based application. Some of the UI strings may also be generated dynamically during the execution of the web-based application and, therefore, the human translators will be unable to translate these UI strings without executing the web-based application themselves. Screenshots could be provided to the human translator, but this requires time and computing resources and still may fail to capture the context. Further, not all of these possible dynamic UI strings may be output during the human translators' execution of the web-based application.

Conventional techniques for translating UI strings of web-based applications may require pre-processing of webpages in order to provide on-the-spot translation functionality, and thus these techniques may not be applied to any running web-based application. More specifically, these techniques may require a cracked version of a specific web-based application that has UI string identifiers embedded along with the UI strings in a corresponding web page. These techniques, however, may require the maintenance of a separate remote server, which can increase costs. These techniques may also redirect the human translator to a separate web page in order to perform translation, which is not user-friendly and thus is not actually "on-the-spot." Furthermore, these techniques may also increase loading time of the web page due to the embedded UI string identifiers and/or may make the UI string identifiers visible to and/or discoverable by end users, which may be undesirable.

Accordingly, techniques are presented for on-the-spot translation of web-based applications without annotated UI strings. The term "on-the-spot" translation as used herein refers to manual (human) translation of UI strings in a web-based application without delay and without additional actions by the user. In one implementation, these techniques can be implemented as part of crowd-sourcing translations from end users across a wide array of web-based applications. In other implementations, these techniques can be implemented as part of translation localization. The techniques can include utilizing a translation application (a widget, an extension, a plug-in) within web browser software to identify text portions that are possible UI strings. These text portions can be sent to a remote server associated with a database (e.g., an index table) of UI strings. This database can be populated with entries based on previous scanning of a collection of source documents (e.g., hypertext markup language (HTML) files) for a collection of web pages. Repeat text portions in a respective source document can be indicative of a UI string as opposed to user-generated content.

When a match is found, a text portion can be determined to be a UI string. The remote server can return all the matches (i.e., the UI strings) to the translation application. The translation application can then identify these UI strings within the web-based application on-the-spot. For example, the translation application may highlight the UI strings. By observing these UI strings in the context of the web-based application, a human translator can be more likely to provide an accurate manual translation of the UI strings from their source language (e.g., English) to a target language (e.g., Spanish). To further assist the human translator, in response to a selection of a particular UI string by the human translator, the translation application can provide the human translator with metadata relating to the selected UI string. The metadata can include any suitable information for assisting the human translator in translating the selected UI string (the source language, information about the webpage, etc.). The human translator can then provide their manual translation of the selected UI string, which can be output to other users and/or stored for future purposes (e.g., creating and/or training a language model).

Referring now to FIG. 1, a computing network 100 is illustrated. The computing network 100 can include both an example server 104 and an example computing device 108 according to some implementations of the present disclosure. The server 104 and the computing device 108 can communicate with each other via a network 112. The term "server" as used herein can refer to any suitable hardware computer server, as well as two or more servers operating in a parallel or distributed architecture that collectively implement at least a portion of the techniques of the present disclosure. Examples of the computing device 108 include a desktop computer, a laptop computer, a tablet computer, and a mobile phone. The network 112 can include a local area network (LAN), a wide area network (WAN), e.g., the Internet, or a combination thereof.

A human translator 116 can operate the computing device 108. It should be appreciated that the term "human translator" as used herein can refer to any user capable of translation from a source language, e.g., English, to a target language, e.g., Spanish, and thus may include both professional translators as well as users having limited or no experience in translation from the source language to the target language. It should be appreciated that while a single computing device 108 and a single human translator 116 are shown, the computing network 100 can include two or more computing devices and two or more human translators that can collectively participate in the techniques of the present disclosure. The server 104 can also be associated with a database 120 of UI strings, which is described in greater detail below. It should be appreciated that the database 120 may be part of the server 104 or separate from the server 104.

Figure 2:
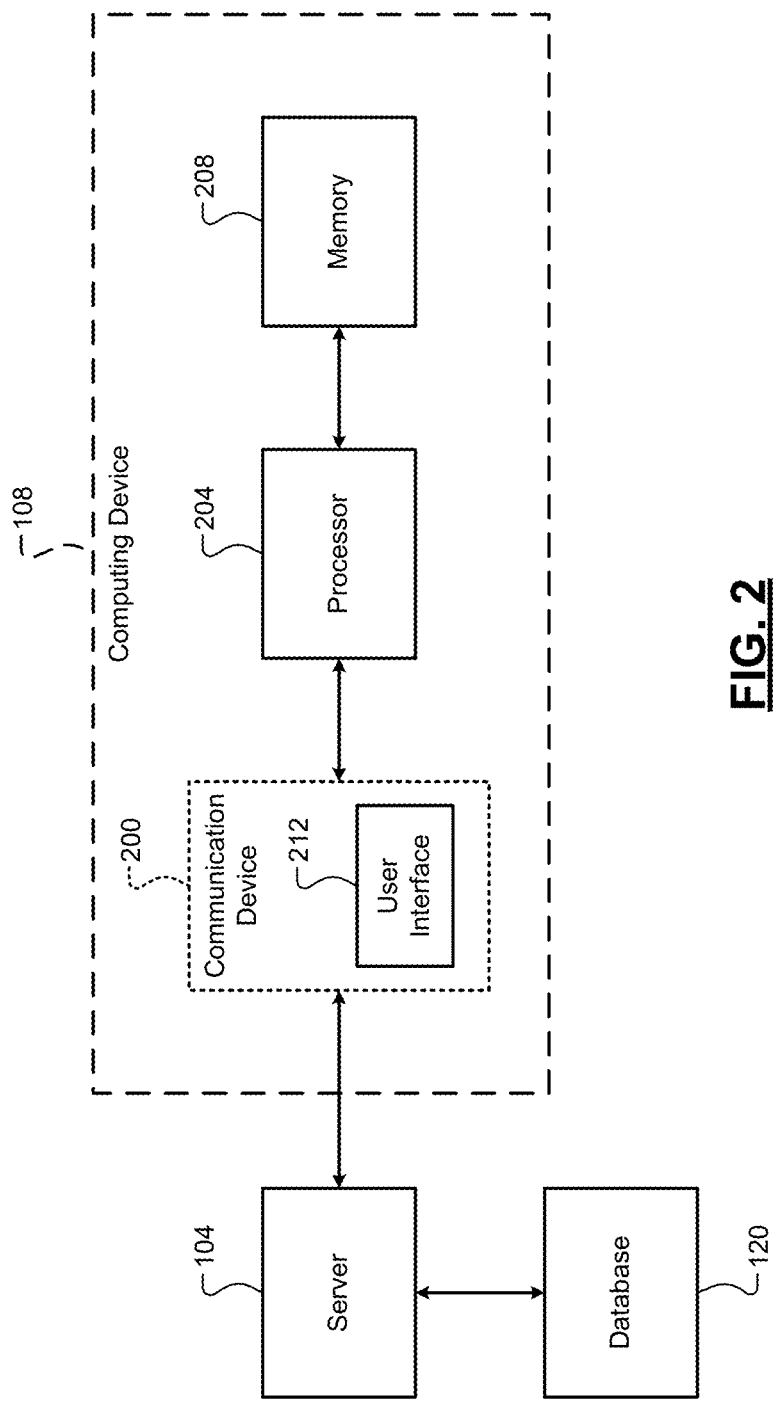
FIG. 2 depicts a functional block diagram of the example computing device of FIG. 1.

Referring now to FIG. 2, an example functional block diagram of the computing device 108 is illustrated. It will be appreciated that the server 104 can include the same or similar components as the computing device 108. The computing device 108 can include communication devices 200, a processor 204, and a memory 208. The communication devices 200 can include a user interface 212 and any suitable components (e.g., a transceiver) configured for communication via the network 112. Example components of the user interface 212 include a display, such as a touch display, a mouse, a keyboard, and a microphone. The processor 204 can control operation of the computing device 108. The term "processor" as used herein can refer to both a single processor and two or more processors operating in a parallel or distributed architecture. The memory 208 can be any suitable storage medium configured to store information at the computing device (flash, hard disk, etc.). The processor 204 can also execute at least a portion of the techniques of the present disclosure, which are described in greater detail below.

The computing device 108 can receive a source document for a webpage that includes a web-based application. One example of the source document is an HTML file. The source document can be provided to the computing device 108 from a remote server (e.g., a server hosting the webpage) in response to a request, such as an HTML request. The source document can include source code for the web-based application or, alternatively, the source code may be provided by the remote server separately or retrieved by the computing device 108 from another location (e.g., another server). One example of the source code is JavaScript. In response to receiving the source document, the computing device 108 can load the webpage using web browser software executing at the computing device 108. Loading the webpage can also include executing the web-based application, but the execution of the web-based application may also be performed in response to some specific action or selection by the human translator 116.

Examples of the web-based application can include a web-based video streaming/playback application and a web-based email application. Once the web-based application is executing within the web browser software at the computing device, the computing device 108 can receive a request to translate at least a portion of the web-based application. This request can be a manual request from the human translator 116 or an automatic request. The manual request, for example, may be the human translator obtaining and launching a translation application within the web browser software. The automatic request, for example, may be a call by the webpage to an API (e.g., a JavaScript API) to launch the translation application. The translation application (also referred to as a "translation widget") can be any suitable extension or plug-in of the web browser software. Once initiated, the translation application can perform a series of operations (e.g., automatically and without any intervention by the human translator 116).

The translation application can identify text portions in the web-based application that may be UI strings. In one implementation, the translation application can scan the source document (or, more particularly, the source code) to identify these text portions. The translation application can then transmit these text portions to the server 104. The server 104 can be associated with the database 120, which includes a collection of previously-identified UI strings. For example, these UI strings may have been identified by the server 104 (e.g., the database 120 may be constructed) by scanning a collection of source documents associated with a collection of webpages. When a particular text portion occurs more than once in a respective source document, the server 104 can determine that that particular text portion is a UI string as opposed to user-generated content (code, tags, programmer notes/comments, etc.). This process can be performed off-line and is separate from the on-the-spot translation techniques at the computing device 108.

Storing the UI strings at the database 120 (e.g., constructing the database 120) can also include normalization to account for specific forms. If the UI string does not have a placeholder, the UI string can be directly written to the database 120, in some cases along with metadata. If the UI string does have a placeholder, the UI string can be written to the database 120 with a wildcard in place of the placeholder. The term "placeholder" refers to a generic portion of a string, such as a number. For example, the strings "20% complete" and 30% complete" correspond to the UI string "{NUM}% complete," and the wildcard symbol "$" can be written in place of the placeholder "{NUM}" ("$% complete"). Another possible normalization is with respect to plural and gender forms. If the UI message contains a plural or gender form, each specific UI string can be written to the database 120. For example, for the UI string "He walks," the UI string "She walks" can also be written to the database 120.

In response to receiving the text portions from the translation application, the server 104 can attempt to match each text portion to an entry in the database 120 of UI strings. The server 104 can then return all matches ("UI strings") to the translation application. The translation application can provide an indicator of a particular UI string when the particular UI string is displayed during execution of the web-based application. The purpose of identifying the UI strings within the web-based application is to notify the human translator 116 of a UI string that can/should be translated. For example, the translation application may underline the particular UI string, but other suitable forms of identification may be used, such as underlining or using arrow indicators. The human translator 116 can then select the particular UI string to provide his/her translation of the particular UI string from its source language (e.g., English) to a target language (e.g., Spanish). For example, the translation application may intercept the selection of the particular UI string.

In response to the human translator 116 selecting the particular UI string, the translation application may also provide metadata to the human translator 116 to assist the human translator 116 in translating the particular UI string. This metadata may be obtained along with the UI strings from the server 104 or later in response to selecting the particular UI string. For example, the metadata may be displayed within the web-based application, within the web-browser, or in another suitable display location at the computing device 108. The metadata can be context information for assisting the human translator 116 in translating the particular UI string. This context information can be information that is outside of a context of the web-based application. Examples of the metadata include an identifier of the UI string, its source language, and an identifier or other information about the webpage. The human translator 116 can then provide his/her manual translation of the particular UI string to the target language. These translations can be provided to other users and/or stored or future use. In one implementation, these translations can be crowd-sourced and the collection of translations can be used to create and/or train a language model.

Figure 3:
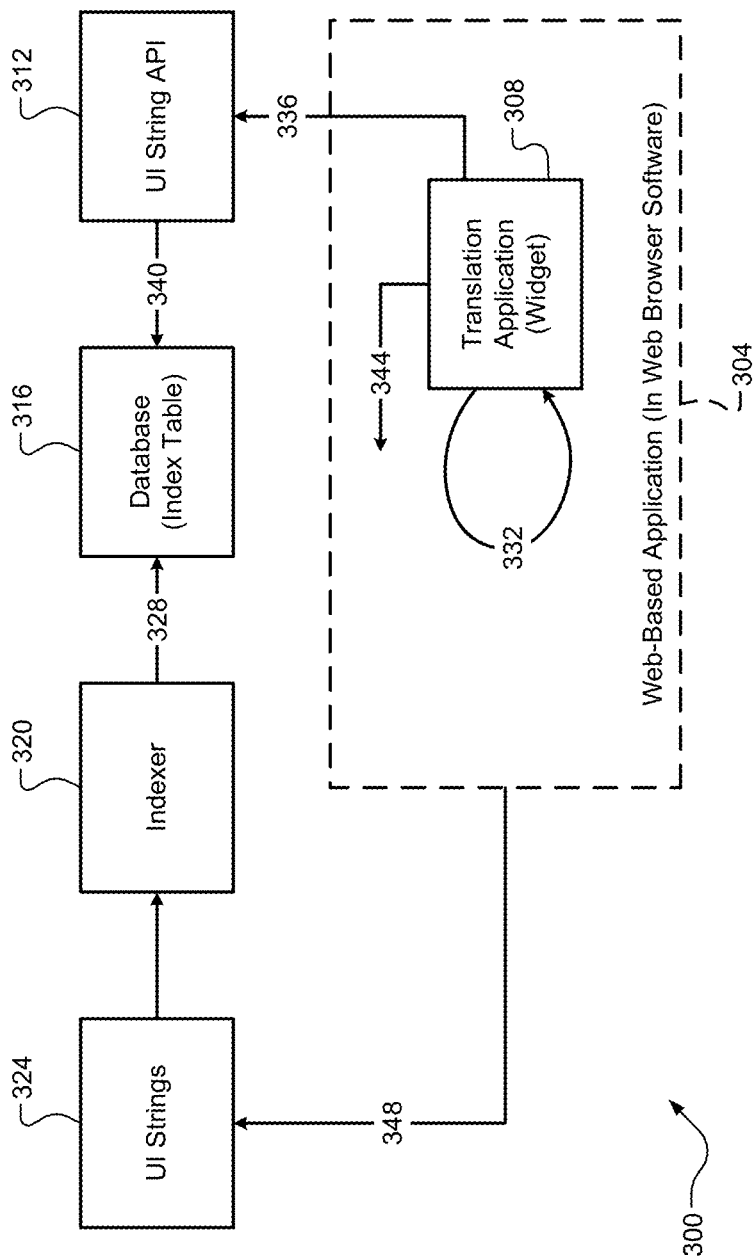
FIG. 3 depicts a workflow diagram for an example technique for on-the-spot language translation of web-based applications without annotating user interface (UI) strings according to some implementations of the present disclosure.

Referring now to FIG. 3, an example workflow diagram ("workflow") 300 for a technique for on-the-spot translation of web-based applications without annotating UI strings is illustrated. The workflow 300 illustrates various items 304-324 and their specific interactions 328-348. The items can include a web-based application 304 executing within the web browser software, a translation application (or 'widget') 308 also executing within the web browser software, a UI string API 312, a database (or "index table") 316, an indexer 320, and UI strings 324. It should be appreciated that the UI string API 312 can be implemented by the server 104, the web-based application 304 and the translation application 308 can be implemented by the computing device 108 (within the web browser software executing at the computing device 108), and the database 312 can be (or be part of) the database 120.

To begin the workflow 300, back-end processing (e.g., at the server 104) can occur prior to on-the-spot translation via the computing device 108. A first interaction 328 can represent the indexer 320 writing to the database 316 (e.g., an index table). More specifically, the indexer 320 can scan a collection of source documents for a collection of webpages and identify text portions. When a specific text portion occurs more than once in a respective source document, the indexer 320 can determine that that specific text portion is more likely a UI string rather than user-generated content, and thus the indexer 320 can write that specific text portion to the database as a UI string. In some implementations, when UI strings include placeholders, the indexer 320 can write the UI string to the database 316 with a wildcard in place of the placeholder. In other implementations, when UI strings include plural or gender forms, each specific UI string can be written to the database 316 (as opposed to indexing a generic sentence for all of the various plural/gender forms).

A second interaction 332 can represent the translation application 308 being launched. As discussed herein, the translation application 308 may be launched manually, e.g., by the human translator 116, or automatically called by the webpage via an API, e.g., a JavaScript API. In response to launching the translation application 308, the translation application 308 can start a series of interactions (e.g., automatically). A third interaction 336 can represent the translation application 308 searching for text portions within the UI of the web-based application 304. This can be performed in conjunction with the UI string API 312. After obtaining the text portions, the UI string API 312 can perform a fourth interaction 340, which can represent a query to the database 316.

In response to the query, UI strings can be obtained and returned to the translation application 308. While not shown, this may represent an additional interaction. A fifth interaction 344 can represent the translation application 308 providing an indicator for (e.g., highlighting) a particular UI string when the particular UI string 324 is displayed during execution of the web-based application 304. A sixth interaction 348 can represent the human translator 116 selecting the particular UI string 324 for manual translation. This can include retrieving or loading metadata for the particular UI string 324. In some implementations, any additional information obtained during this process or provided by the human translator 116 can also then be added to the metadata in the database 316 via the indexer 320. This entire process can then repeat, e.g., for another web-based application.

Referring now to FIG. 4, an example flow diagram for a technique 400 for on-the-spot translation of web-based applications without annotating UI strings is illustrated. It should be appreciated that this technique 400 may be executed multiple times for a single webpage, such as a webpage including multiple web-based applications. At 404, the computing device 108 can receive a source document for a webpage requested by web browser software executing at the computing device 108, the webpage including a web-based application. For example, the source document may be transmitted to the computing device 108 from a remote server in response to a request, such as an HTML request. At 408, the computing device 108 can execute the web-based application within the web browser software. At 412, the computing device 108 can determine whether a request to translate at least a portion of the web-based application has been received. For example, this request may correspond to the translation application being launched at the computing device 108. In response to receiving the request, the computing device 108 can perform the following steps 416-424 (e.g., automatically). If the request has not been received, the technique 400 can end or return to 412.

At 416, the computing device 108 can identify text in the web-based application. At 420, the computing device 108 can transmit the text portions to the server 104, wherein receipt of the text portions causes the server 104 to match the text portions to entries in the database 120 associated with the server 104 to obtain UI strings. At 424, the computing device 108 can receive the UI strings from the server 104. At 428, in response to receiving the UI strings, the computing device 108 can provide an indicator of a particular UI string when the particular UI string is displayed during execution of the web-based application. For example, the particular UI string may be highlighted. At 432, the computing device 108 can determine whether a selection of the particular UI string has been received. If the particular UI string has not been selected, the technique 400 can end or return to 432. If the particular UI string has been selected, the technique 400 can proceed to 436. At 436, the computing device 108 can output metadata associated with the particular UI string, the metadata representing context information for assisting the human translator 116 in translating the selected UI string. The technique 400 can then end or return to 404.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, at a computing device having one or more processors, a source document for a webpage requested by web browser software executing at the computing device, the webpage including a web-based application;
   executing, at the computing device, the web-based application within the web browser software;
   receiving, at the computing device, a request to translate at least a portion of the web-based application;
   in response to receiving the request:
      identifying, at the computing device, text portions in a user interface (UI) of the web-based application,
      transmitting, from the computing device to a server, the text portions, wherein receipt of the text portions causes the server to match the text portions to entries in a database associated with the server to obtain UI strings, and
      receiving, at the computing device from the server, the UI strings;
   in response to receiving the UI strings, providing, at the computing device, an indicator of a particular UI string when the particular UI string is displayed during execution of the web-based application;
   receiving, at the computing device, a selection of the particular UI string; and
   outputting, at the computing device, metadata associated with the particular UI string, the metadata representing context information for assisting a human translator in translating the particular UI string.

2. The computer-implemented method of claim 1, wherein the metadata includes context information that is outside of a context of the web-based application.

3. The computer-implemented method of claim 2, wherein the metadata includes at least one of an identifier for the UI string, a language of the UI string, and an identifier for the webpage.

4. The computer-implemented method of claim 1, further comprising obtaining, at the computing device, the metadata from the database associated with the server (i) when receiving the UI strings or (ii) in response to the selection of the particular UI string.

5. The computer-implemented method of claim 1, wherein receipt of the text portions causes the server to (i) segment the text portions to obtain segmented text portions and (ii) match segmented text portions to entries in the database to obtain the UI strings.

6. The computer-implemented method of claim 1, wherein the database is constructed by:
   scanning a collection of source documents for webpages to identify source text portions; and
   identifying source text portions that occur more than once in their respective source documents to obtain the entries for the database.

7. The computer-implemented method of claim 6, wherein the database is constructed by normalizing each entry with respect to its specific form based on (i) whether it includes a placeholder and (ii) whether it includes a plural or gender form, wherein a specific placeholder identifies a generic portion of a specific entry.

8. The computer-implemented method of claim 1, wherein providing the indicator for the particular UI string includes highlighting the particular UI string.

9. The computer-implemented method of claim 1, further comprising in response to receiving the request, executing, at the computing device, a translation application within the web browser software, wherein the translation application is configured to:
   (i) identify the text portions,
   (ii) transmit the text portions to the server,
   (iii) receive the UI strings from the server,
   (iv) cause the indicator for the particular UI sting to be provided when the particular UI string is displayed during execution of the web-based application,
   (v) detect the selection of the particular UI string, and
   (vi) obtain and output the metadata associated with the particular UI string.

10. The computer-implemented method of claim 9, wherein the translation application is a JavaScript extension or plug-in for the web browser software that is (i) manually installed by the human translator or (ii) automatically called by the webpage using a JavaScript application program interface (API).

11. A computing device, comprising:
    a memory configured to store a set of instructions; and one or more processors configured to execute the set of instructions, which causes the one or more processors to perform operations comprising:

receiving a source document for a webpage requested by web browser software executing at the computing device, the webpage including a web-based application;

executing the web-based application within the web browser software;

receiving a request to translate at least a portion of the web-based application;

in response to receiving the request:

identifying text portions in a user interface (UI) of the the web-based application, transmitting the text portions to a server, wherein receipt of the text portions causes the server to match the text portions to entries in a database associated with the server to obtain UI strings, and receiving the UI strings from the server;

in response to receiving the UI strings, providing an indicator of a particular UI string when the particular UI string is displayed during execution of the web-based application;

receiving a selection of the particular UI string; and outputting metadata associated with the particular UI string, the metadata representing context information for assisting a human translator in translating the particular UI string.

12. The computing device of claim 11, wherein the metadata includes context information that is outside of a context of the web-based application.

13. The computing device of claim 12, wherein the metadata includes at least one of an identifier for the UI string, a language of the UI string, and an identifier for the webpage.

14. The computing device of claim 11, wherein the operations further comprise obtaining the metadata from the database associated with the server (i) when receiving the UI strings or (ii) in response to the selection of the particular UI string.

15. The computing device of claim 11, wherein receipt of the text portions causes the server to (i) segment the text portions to obtain segmented text portions and (ii) match segmented text portions to entries in the database to obtain the UI strings.

16. The computing device of claim 11, wherein the database is constructed by:

scanning a collection of source documents for webpages to identify source text portions; and identifying source text portions that occur more than once in their respective source documents to obtain the entries for the database.

17. The computing device of claim 16, wherein the database is constructed by normalizing each entry with respect to its specific form based on (i) whether it includes a placeholder and (ii) whether it includes a plural or gender form, wherein a specific placeholder identifies a generic portion of a specific entry.

18. The computing device of claim 11, wherein providing the indicator for the particular UI string includes highlighting the particular UI string.

19. The computing device of claim 11, wherein the operations further comprise in response to receiving the request, executing a translation application within the web browser software, and wherein the translation application is configured to:

(i) identify the text portions, (ii) transmit the text portions to the server, (iii) receive the UI strings from the server, (iv) cause the indicator for the particular UI sting to be provided when the particular UI string is displayed during execution of the web-based application, (v) detect the selection of the particular UI string, and (vi) obtain and output the metadata associated with the particular UI string.

20. The computing device of claim 19, wherein the translation application is a JavaScript extension or plug-in for the web browser software that is (i) manually installed by the human translator or (ii) automatically called by the webpage using a JavaScript application program interface (API).

\* \* \* \* \*